United States Patent [19]
Yevick

[11] 4,113,348
[45] Sep. 12, 1978

[54] CHANNEL ILLUMINATION SHEETS

[75] Inventor: George J. Yevick, Leonia, N.J.

[73] Assignee: Izon Corporation, Stamford, Conn.

[21] Appl. No.: 714,215

[22] Filed: Aug. 13, 1976

[51] Int. Cl.² ............................................. G02B 5/17
[52] U.S. Cl. ................................. 350/96.25; 353/27 R
[58] Field of Search .............. 350/96 BC, 96 B, 96 R, 350/96.25, 96.10, 96.24; 353/27 R, 27 A, 120; 355/46

[56] References Cited
U.S. PATENT DOCUMENTS

| 3,402,000 | 9/1968 | Crawford | 350/96 BC |
| 3,704,068 | 11/1972 | Waly | 350/96 B |
| 3,864,034 | 2/1975 | Yettick | 350/96 B |

Primary Examiner—John K. Corbin
Assistant Examiner—Stewart Levy
Attorney, Agent, or Firm—Thomas J. Greer, Jr.

[57] ABSTRACT

A method of making illuminating sheets for microfiche readers. The illuminating sheet includes light conducting channels in a base or carrier having low creepage and low coefficients of thermal and of humidity expansion which terminate at different points accurately located over the surface of the sheet. The channel termini have mirrors which reflect light and thereby illuminate microimages on a microfiche. The method includes embossing elongated channels of different lengths onto a transparent, plastic sheet by means of an embossing roll. The roll carries spaced discs, the discs having peripheries of different lengths to thereby form channels of different lengths. The channels are then filled.

8 Claims, 15 Drawing Figures

CHANNEL ILLUMINATION SHEETS

This invention relates to an illumination sheet for illuminating the microimages on a microfiche. Microfiche devices which are in the general field of this invention are illustrated, for example, in my U.S. Pat. Nos. 3,824,609; 3,950,769; and 3,864,034.

In all these patented constructions and in similar constructions, accuracy of location of a multiplicity of light sources must be rigorously maintained against environmental fluctuations such as those of temperature and humidity and creepage resulting from ageing.

The invention exhibits particular utility in a type of microfiche illuminating device defined by a base or substrate carrying on one surface a plurality of parallel, light conducting channels. The channels are of different length and their termini are so arranged that they define a generally rectangular array of mirrors which in turn define tiny areas of sources of illumination for the upward projection of light to illuminate microimages carried by a microfiche. Such illumination devices are shown, for example, at FIGS. 11–16 of my U.S. Pat. No. 3,864,034 and also at FIGS. 10 and 11 of application Ser. No. 536,409, filed Dec. 26, 1974, by Lawrence W. Grunberger, commonly assigned and incorporated by reference. According to the practice of this invention such illumination plates are fabricated by a roll element having a plurality of axially spaced deforming discs. This disc roll operates on one surface of a substrate or a composite substrate and cooperates with a pressure or back-up roll having a smooth periphery. The discs deform the substrate to thereby define channel elements. In one embodiment, the discs deform a sheet metal substrate such as aluminum with the channels being coated and subsequently filled with transparent substances having different indices of refraction. According to another embodiment, a transparent sheet is deformed by a disc roll to define channels therein and the transparent substance coated with a transparent material having a different index of refraction. The material of the substrate will have lower coefficients of thermal expansion and of humidity expansion than that of the transparent light channeling material. Furthermore, the creepage of the substrate is markedly less than that of the transparent light conducting channels. Hence, the locations of all the mirrors vis-a-vis each other are accurately maintained since the mirrors are locked into the substrate, which mirrors have accurately been located by the methods disclosed herein.

Figure 1:
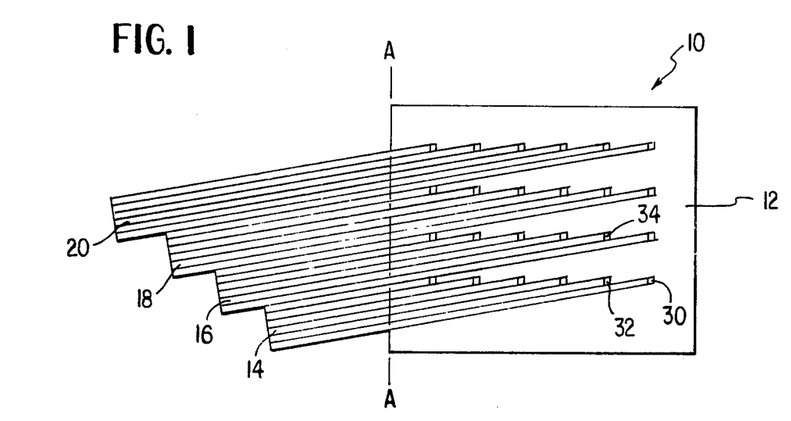
FIG. 1 is a plan view of a typical illumination sheet formed in accordance with the practice of this invention.

Referring now to FIG. 1 of the drawings, the numeral 10 denotes an illumination plate including a planar member 12 and a plurality of sets 14, 16, 18, 20 of totally internally reflecting light channels having rectangularly arrayed termini 30, 32, 34, etc. Similar to what is shown in my U.S. Pat. No. 3,864,034, the left ends of channel elements 14–20 are subsequently curled or rolled to form an entrance end for receiving light from an artificial source of illumination, the light passing through the channel elements and passing by means of suitable reflectors outwardly at points 30, 32, 34 for the purpose of illuminating microimages carried by a microfiche.

Figure 2:
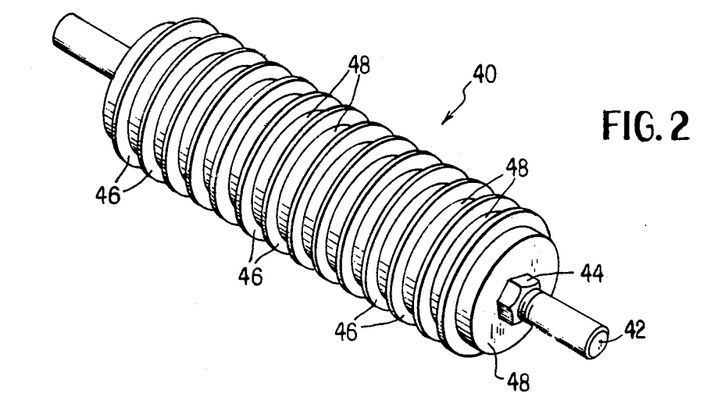
FIG. 2 is a perspective view of a disc deforming roll.
Figure 3:
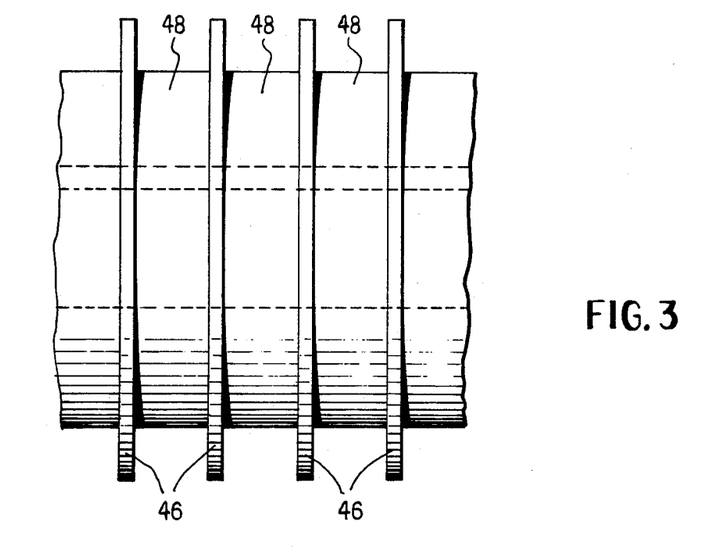
FIG. 3 is a partial elevational view of the disc roll of FIG. 2.

Referring now to FIGS. 2 and 3 of the drawings, a portion of the apparatus employed to fabricate such an illumination plate is illustrated. The numeral 40 denotes a disc roll including a spindle 42 carrying threaded fasteners 44 at its ends, only one fastener being illustrated. The numerals 46 and 48 denote adjacent and axially spaced disc elements. Each of the disc elements may include a slot (not shown) for the reception of an elongated aligning key carried by shaft 42. The key and the threaded fasteners 44 serve to assemble the disc roll shown at FIGS. 2 and 3, the elements being formed preferably of a hard substance such as a metal.

Figure 4:
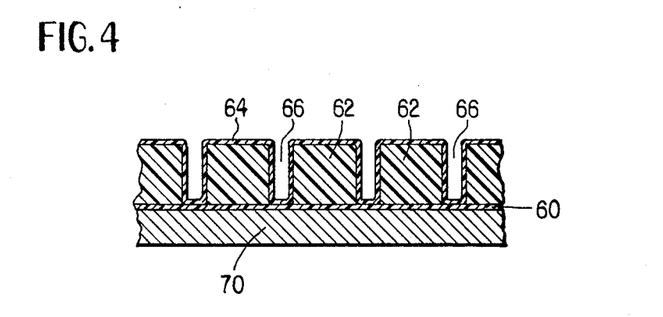
FIG. 4 is a partial cross-sectional view taken along typical section A—A of FIG. 1.

Referring now to FIG. 4 of the drawings, a typical cross-sectional view of a portion of an illumination sheet of the type of FIG. 1 is shown. The numeral 70 denotes a carrier plate formed, for example, of aluminum. The carrier plate is fashioned from material having substantially lower coefficients of humidity and of thermal expansion than that of the light channeling material. Likewise, the creepage due to ageing of the carrier plate is substantially less than that of the light channeling material. Element 70 is generally in the form of a flat sheet and has a transparent layer 60 of index of refraction $n_1$ over its top surface. The numeral 62 denotes any one of a plurality of generally rectangular and parallel strips each having an index of refraction $n_2$. The numeral 64 denotes a transparent coating of index of refraction $n_3$ surrounding each strip 62 and extending down into the spaces 66 between them. In general $n_2 > n_1$ and $n_2 > n_3$. Inasmuch as the light channeling material is locked into the carrier plate, the dimensional stability of the light channels will be thereby greatly enhanced because they will possess essentially the same stability as that of the carrier plate.

Figure 5:
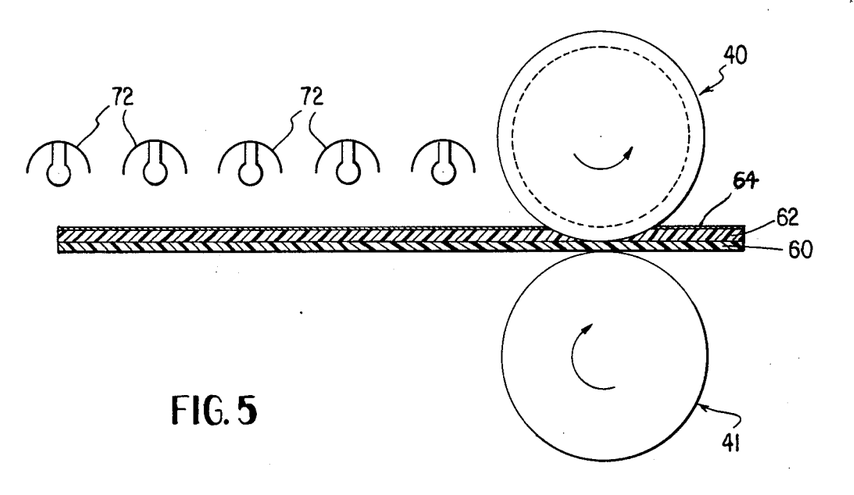
FIG. 5 is a partially schematic illustration of the fabrication of the embodiment shown in FIG. 4.

To fabricate the illumination sheet of FIG. 4, a sheet of transparent material of index $n_2$ and having coatings $n_1$ and $n_3$ on its top and bottom surfaces, respectively, is placed between a smooth surface pressure roll and the roll 40 of FIG. 2. Preferably, the sheet is heated as by infra red lamps and additionally the rolls may also be heated. Rotation of the two rolls draws the sheet through their nip, to thereby form the upper configuration illustrated at FIG. 4. The sheet of index $n_2$ is deformed to define strips 62. This is shown at FIG. 5.

As will be apparent from the description to follow, the embossing discs 48 include peripheral portions of different radii, so that the light conducting channels 62 will have biased ends which are mirror finished to yield reflectors 30, 32, 34, etc. Then the deformed sheet is fastened to or adhered to carrier 70.

Figure 6:
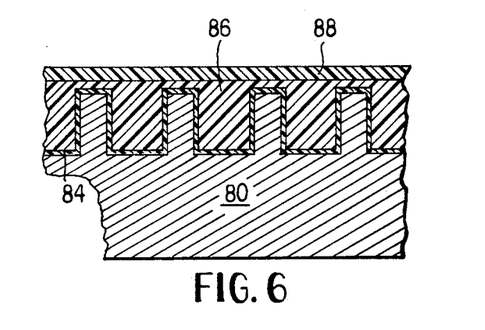
FIG. 6 is another typical cross-sectional view taken along section A—A of FIG. 1 and illustrates another embodiment.
Figure 7:
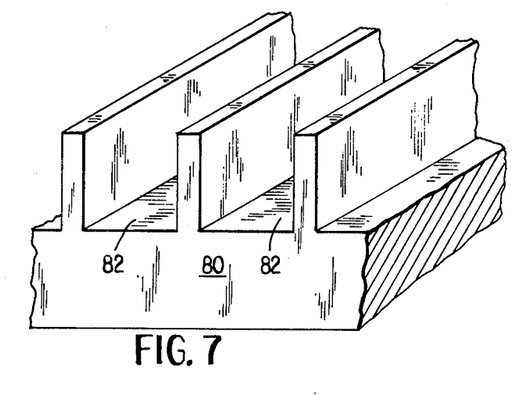
FIG. 7 is a perspective view of a portion of a deformed aluminum substrate.

Referring now to FIGS. 6 and 7 of the drawings, another modification of a light-conducting channel element of the invention is illustrated. In manner entirely analogous to the deformation step previously given, an aluminum substrate denoted by the numeral 80 is deformed to define parallel channels 82. At the conclusion of this deforming step, a transparent material 84 having a first index of refraction $n_1$ is coated on the top of the deformed substrate 80. Next, the channels 82 are filled with a transparent material 86 having a greater index of refraction $n_2$. Lastly, another coating of a transparent material 88 such as the material which defines coating 84, is placed on top to thereby cover the channels. The channels are totally internally reflecting. One method for filling channels 82 is with a prepolymer which is then polymerized by ultra-violet radiation. Another is to polymerize in situ a monomer with the aid of a catalyst. Still a third method is to roll a polymer sheet of index $n_2$ directly into the channels, the sheet being substantially coextensive with the lighting sheet.

Figure 8:
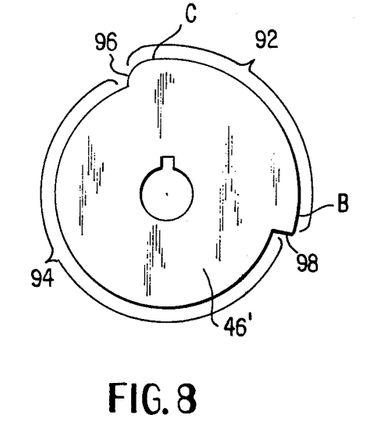
FIG. 8 is a plan view of a typical deforming die roll employed in carrying out the invention.
Figure 9:
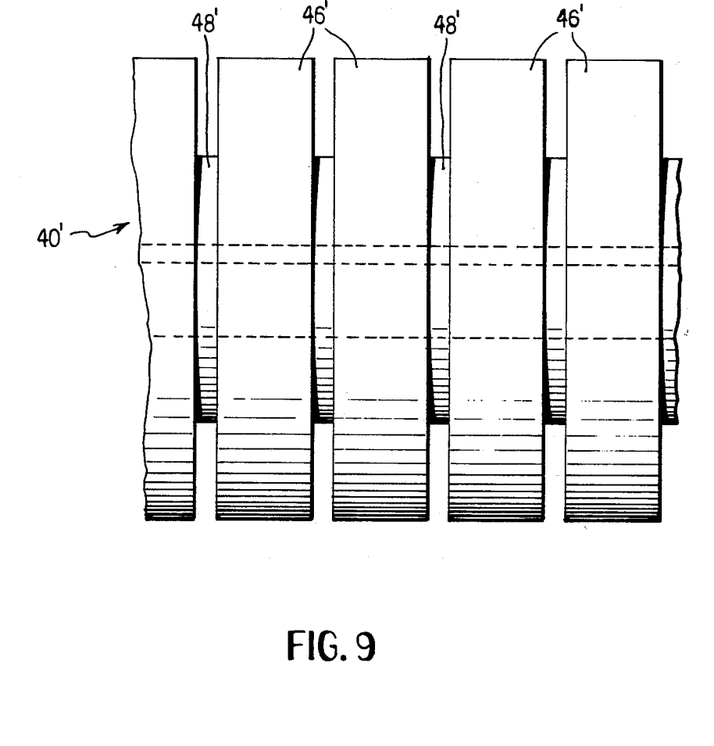
FIG. 9 is a view similar to FIG. 3 and illustrates a die roll for forming the channeled element of FIG. 7.

Referring now to FIG. 8 of the drawings, a typical deforming disc 46' of disc roll 40' of FIG. 9 is illustrated. The disc periphery of a typical disc 46' is composed of two portions. One portion is denoted by the numeral 92 while the other is denoted by the numeral 94. Portion 92 is of the greater radial dimension, the ends of this arcuate portion terminating in rounded portion 96 and stepped portion 98. Referring now to FIG. 1 of the drawings, the reader will readily appreciate that the lengths of the individual light channels elements (being totally internally reflecting) which terminate in reflection portions 30, 32, 34, etc., are different for each of the tongues in the sets of channels 14–20. To generate these different lengths, the disc 46' are made such that adjacent discs of the roll have different peripheral lengths 92. The light input end of any of the channels 82 of FIG. 7 (corresponding to the input ends of tongues 14, 16, etc.) may all commence at the same point, corresponding to portion B of peripheral surface 92 of FIG. 8. However, the arcuate end portions 96 are, for adjacent discs 46', of different angular or arcuate extent. Thus, the portion C of FIG. 8 will be at a different angular position for adjacent discs which generate sets 14, 16, 18 and 20 of the illuminating plate of FIG. 1. It will be understood that the discs 46' are arranged in sets, each set corresponding to a tongue 14, a tongue 16, a tongue 18, etc., of the device, the members of any one set having different arc lengths 92. By making the surfaces 96 of the discs 46' extremely smooth, as by mirror finish, the channel ends corresponding to reflecting surfaces 30, 32, 34, etc., of illuminating plate 12 may be defined directly on the aluminum base 80. Similarly, arcuate portions 92 of each of the discs are also highly polished so as to insure that the interior of channels 82 are smooth.

The accurate registry of all the mirrors relative to each other is maintained by the dimensional stability of the substrate.

Portions 96 of discs 46' thus define, in the deforming process, a transition region between the bottom of channels 82 and the top surface of substrate 80.

The above description has dealt with integrally composite light channels and associated carrier structure for positioning the channels. Thus, a carrier is shown at FIG. 7, while the channels which conduct the light are denoted by 86 at FIG. 6. In some applications, however, optic fibers may be simply placed in grooves, such as the grooves or channels 82 of FIG. 7. In such constructions, the light output ends of the optic fibers which lie in the channels strike reflectors 90 which are formed in a sheet metal carried by mirrored, rounded surface 96 of embossing die rolls, as shown at FIG. 10.

Figure 11:
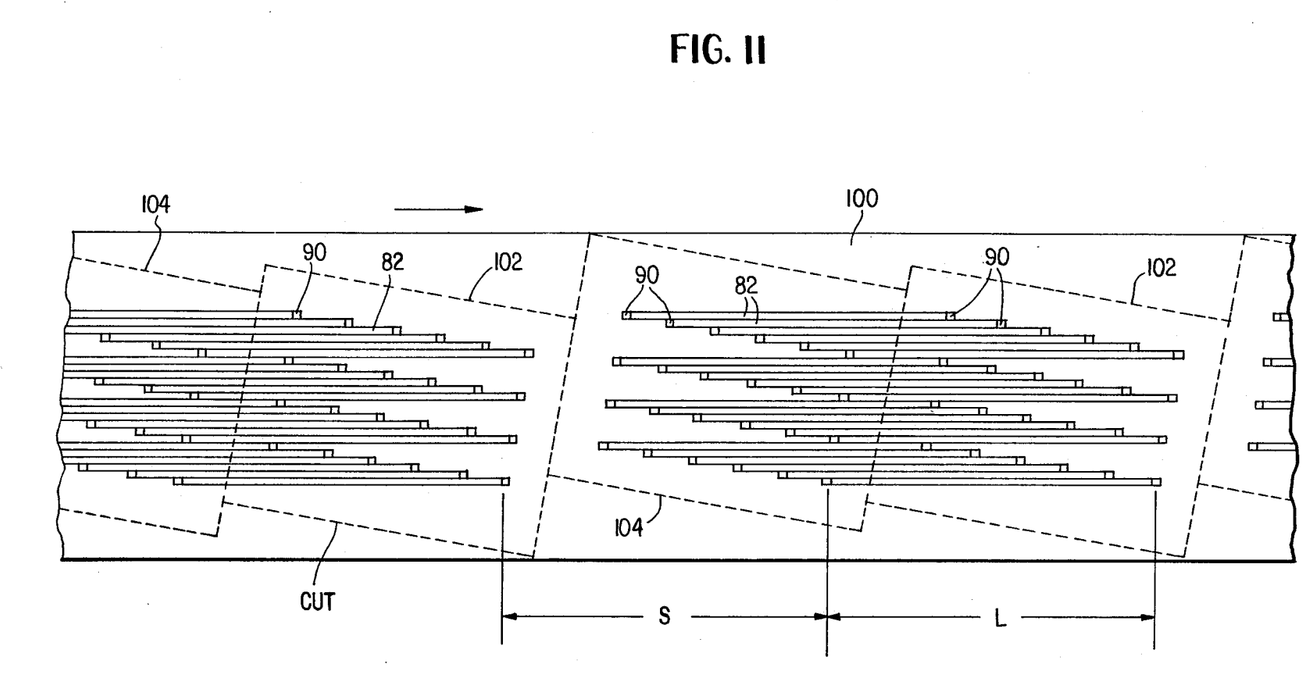
FIG. 11 is a plan view illustrating a method of manufacture of the mirrored and channeled carrier shown at FIG. 10.
Figure 12:
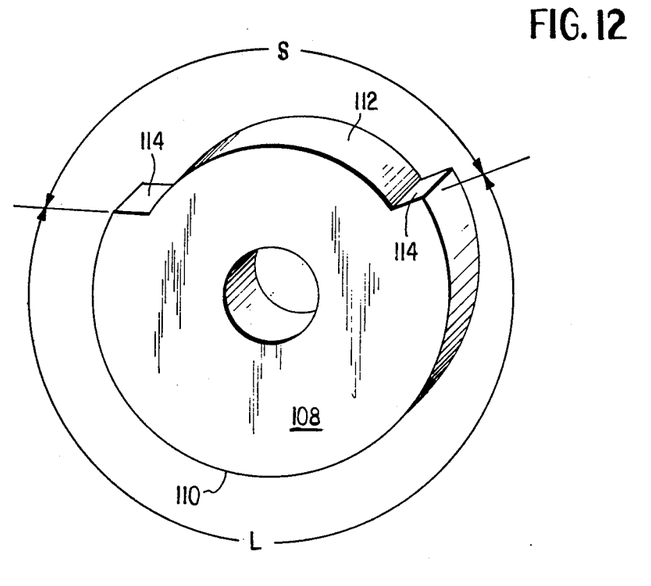
FIG. 12 is a perspective view of an embossing die roll employed with the method of FIG. 11.

Referring now to FIG. 11 of the drawings, a method of fabricating a carrier having channels for the reception of preformed optic fibers is illustrated. The numeral 100 indicates a web of indefinite length, the web being formed of a substrate having the previously described properties, such as aluminum. The numerals 102 and 104 denote adjacent rectangular carriers prior to their being cut out of the web 100. Each carrier 102, 104 is identical. The dashed lines indicate the cuts which are to be made at the completeion of the process now to be described. Referring now to FIG. 12 of the drawings, a plurality of embossing die discs are placed on a common shaft, in a manner similar to that shown at FIG. 2. The embossing discs are each denoted by the numeral 108 and include a major peripheral portion 110 and a minor peripheral portion 112. These two portions are joined by radially extending faces 114, each face and each peripheral portion being of a mirror finish. The embossing discs 108 of FIG. 12 are angularly staggered relative to each other along their common axes. In operation, the plurality of embossing discs 108 are placed transversely across web 100, the web moving while the embossing discs are rotated. The peripheral velocity of the embossing discs 108 is preferably the same as the speed of travel of web 100. Peripheral portions 110 of the embossing discs 108 form channels 82 entirely similar to channels of the embodiment of FIG. 7. Peripheral segment 110 thus defines channels 82 of length L, this being the arc length of portion 110. Peripheral portion 112 of length S is then traversed by the embossing discs on the web 100 without deformation of the latter, until the next face 114 commences to depress the web 100 to form the next series 102, 104 of FIG. 11.

Figure 10:
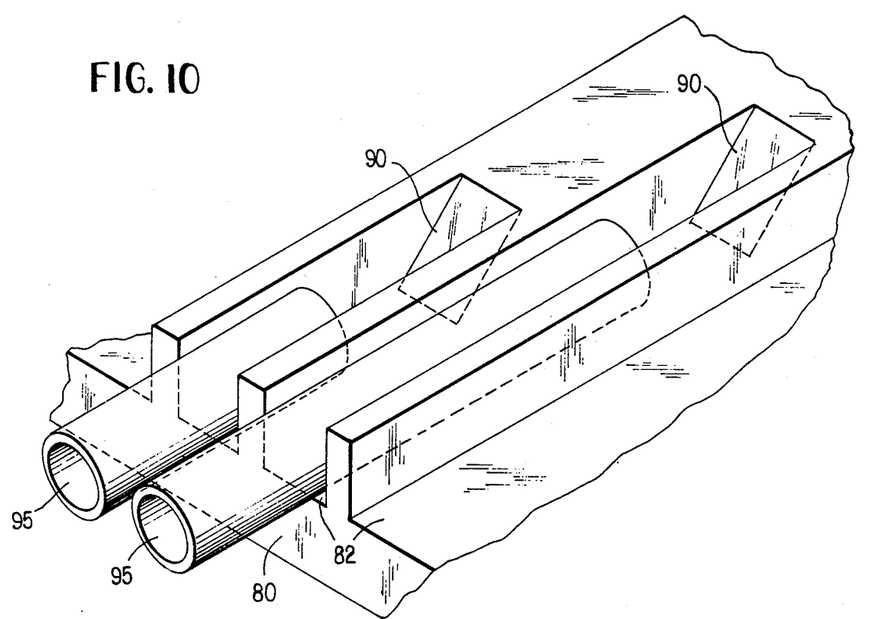
FIG. 10 is a partial perspective view showing preformed optic fibers positioned in a channeled carrier provided with reflecting surface.
Figure 13:
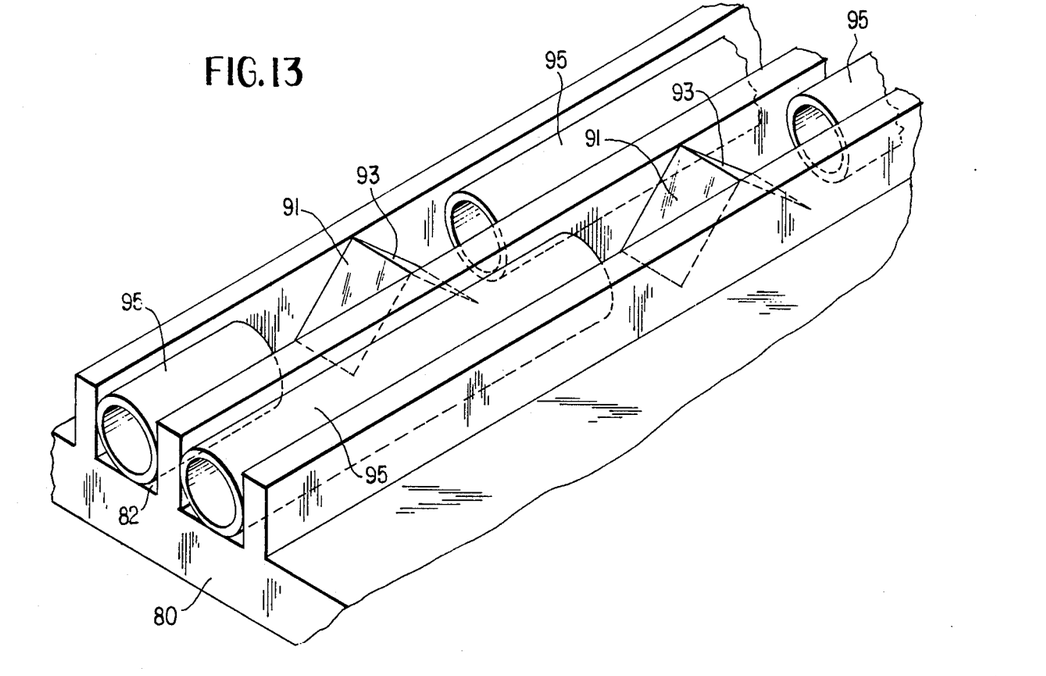
FIG. 13 is a view similar to FIG. 10 and illustrates another embodiment.
Figure 14:
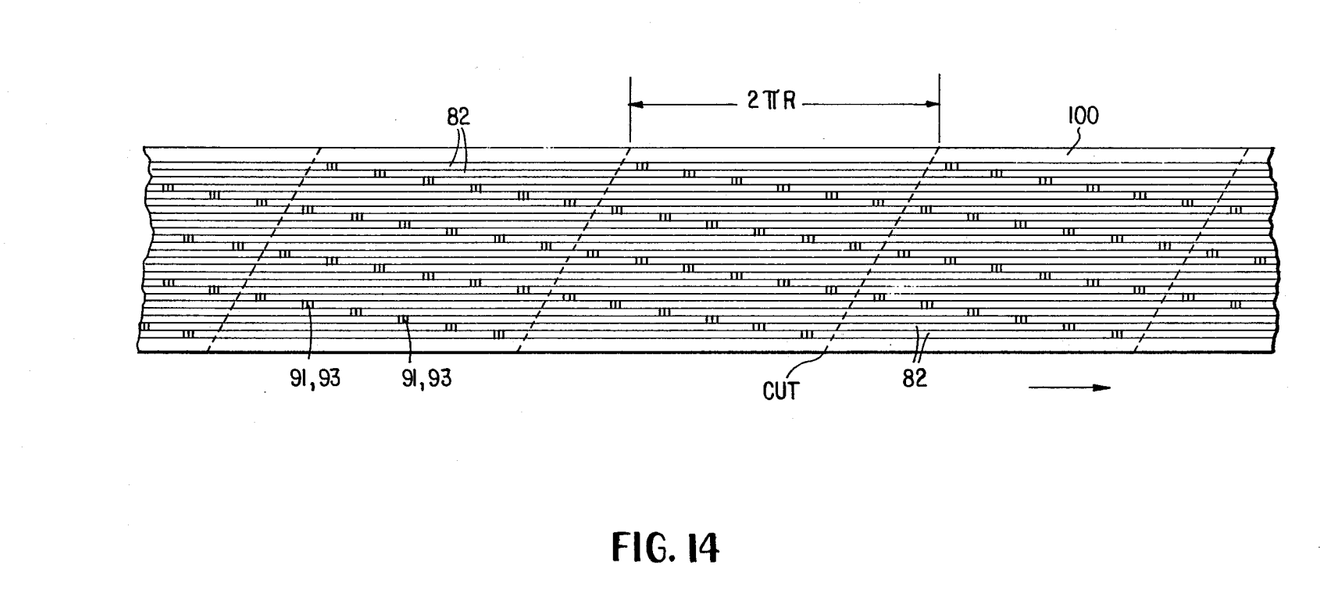
FIG. 14 is a view similar to FIG. 11, and illustrates the method of making the embodiment of FIG. 13.
Figure 15:
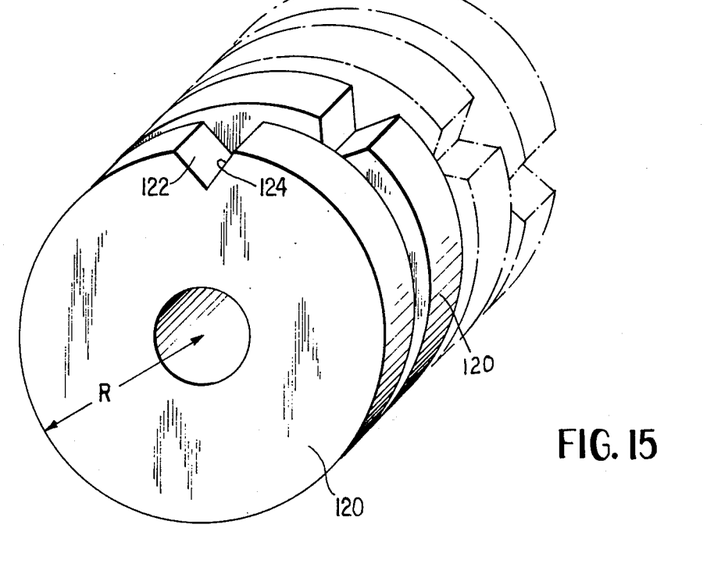
FIG. 15 is a view similar to FIG. 12 and illustrates an embossing die.

Referring now to FIG. 13, another embodiment is illustrated similar to FIG. 10 except that the channels on the carrier extend the entire length of the carrier. Each channel is interrupted, at staggered corresponding portions thereof, with a pair of reflecting surfaces 91, 93 at an angle of about 90° to each other. As indicated at FIG. 13, optic fibers 95 are placed in channels 82 of the carrier from either one edge, or from the other edge, or from both edges. Thus, light from either side of the carrier or from both sides of the carrier may be employed to illuminate microimages. FIGS. 14 and 15 indicate a method of manufacture of the carrier assembly shown at FIG. 13. Again, the numeral 100 (See FIG. 14) denotes an aluminum sheet web of indefinite extent. The numeral 120 at FIG. 15 denotes an embossing die roll having a smooth and continuous periphery except that at a notched portion which carries mirror faces 122 and 124. As before, a common shaft carries a plurality of embossing discs 120, the embossing discs being angularly fixed and spaced relative to each other and are assembled as in the manner shown at FIG. 2 of the drawings. In operation, the embossing discs are pressed down on the web 100 with their common axes transverse to the direction of movement of the web. The periphery of each disc 120 bears into and deforms sheet 100 to form channels 82 and portions 122, 124 of the disc form reflecting surfaces 91 and 93, respectively, of FIG. 13.

The reader will understand that substitution of coherent fiber sub-bundles or single Selfoc fibers in place of illumination fibers 95 in FIGS. 10 and 13 may be made. In this manner, the accuracy of location of subimages is maintained against creepage and thermal and humidity fluctuations when the structure is used to project and magnify microimages or to record information. Such modes of use are described, for example, in my U.S. patents.

What is claimed is:

1. An illuminating sheet for illuminating microimages such as those carried by a microfiche, the sheet including,
   (a) a supporting base,
   (b) a transparent coating material of index of refraction $n_1$ on one surface of the base,
   (c) a plurality of parallel strips of index $n_2$ of refraction, said strips positioned on the said coating of index $n_1$, the strips being spaced from each other so that they do not touch each other,
   (d) a transparent filler of index $n_3$ of refraction covering said parallel strips,
   (e) index $n_2$ being greater than either of indices $n_1$ or $n_3$,
   (f) one end of each of the strips being biased and mirror finished to define a reflecting surface.

2. An illuminating sheet for illuminating microimages such as those carried by a microfiche, the sheet including,
   (a) a supporting base, the supporting base having a plurality of channels on one surface thereof, the channels defined by and having walls between them,
   (b) a transparent coating of index of refraction $n_1$ covering the channel walls,
   (c) a transparent filler of index of refraction $n_2 > n_1$ filling the said channels,
   (d) a transparent coating of index $n_1$ coating the top of the channels,
   (e) whereby the channels are totally internally reflecting and will transmit light therealong,
   (f) mirrors optically aligned with the said internally reflecting channels to reflect light therefrom out of the plane of the supporting base, whereby the reflected light will illuminate microimages on a microfiche for projection to a viewing screen.

3. An optical sheet for illuminating or projecting microimages, the sheet including a generally planar supporting base and a plurality of light conducting channels carried by the base, the channels having termini, the termini each associated with and adjacent to a mirror for reflecting light or microimages passing through the channels out of the plane of the base, the mirrors being affixed to the supporting base and being in an array, the coefficients of thermal and of humidity expansion of the supporting base being less than those of the channels, whereby humidity and temperature changes cause minimal effect on the spacing of the mirrors vis-a-vis each other.

4. The optical sheet of claim 3 wherein the channels each carry a coherent optic fiber sub-bundle.

5. The optical sheet of claim 3 wherein the channels each carry an optical illumination fiber.

6. An optical sheet for illuminating or projecting microimages, the sheet including a generally planar supporting base and a plurality of light conducting channels carried by the base, the channels having termini, the termini each associated with and adjacent to a mirror for reflecting light or microimages passing through the channels out of the plane of the base, the mirrors being affixed to the supporting base and being in an array, the creepage due to ageing of the supporting base being less than that of the channels, whereby creepage changes cause a minimal effect on the spacing of the mirrors vis-a-vis each other.

7. The optical sheet of claim 6 wherein the channels each carry a coherent optic fiber sub-bundle.

8. The optical sheet of claim 6 wherein the channels each carry an optical illumination fiber.

* * * * *